Patented Aug. 29, 1933

1,924,855

UNITED STATES PATENT OFFICE 1,924,855

TREATMENT OF HYDROCARBON OILS

Jacob Benjamin Heid, Chicago, Ill., assignor to Universal Oil Products Company, Chicago, Ill., a corporation of South Dakota Application August 29, 1930. Serial No. 478,611

8 Claims. (Cl. 196—96)

This invention relates to the art of treating hydrocarbon oils, and specifically embodies a process and an improved form of apparatus adaptable for the treatment of hydrocarbon oil vapors.

Distillates, particularly those containing motor fuel and/or other light products, must often be subjected to chemical treatment to remove undesirable materials such as sulphur compounds, gum and polymerization products as well as materials which produce undesirable color or odor in the finished product. Occasionally the finished product is itself treated for the removal of these deleterious materials but it is often advantageous to treat the raw distillate before it is rerun to separate the desirable light products such as motor fuel, kerosene, naphtha, etc. Such distillates whether produced by cracking or by ordinary atmospheric distillation, are, during some stage in the process of refining, in a vaporized state. The main advantages of treating the distillates, while in a vaporized state, are quite obvious and well recognized. It is not only possible to obtain better contact between the hydrocarbon vapors and the treating agents than is ordinarily procured when the hydrocarbons are treated in a liquid state but also due to the contained heat of the hydrocarbon vapors the reaction is generally accelerated and may be facilitated to such an extent that less treating agent is necessary to accomplish the desired results. In many instances vapor phase treating processes may employ less expensive treating materials than the liquid phase treating processes, and in addition the former are in general much more economical.

The present invention embodies a novel process and a new and improved type of apparatus for treating hydrocarbon vapors in many types of treatment independent of the nature of the treating reagents used. The process and apparatus of my invention may be utilized in treating hydrocarbon vapors of any character whether they are generated by ordinary heating, distillation under atmospheric or superatmospheric pressure, or cracking or otherwise.

The attached drawings which are diagrammatic and not drawn to scale, will serve to clearly illustrate two of the many specific forms which my improved apparatus may assume although any form of apparatus embodying the same principles and accomplishing the same results must be considered within the spirit and the scope of the invention. The following description of the drawings will embody, in addition to a description of the apparatus, a concomitant description of the process to which the apparatus is particularly adaptable.

Figure 1:
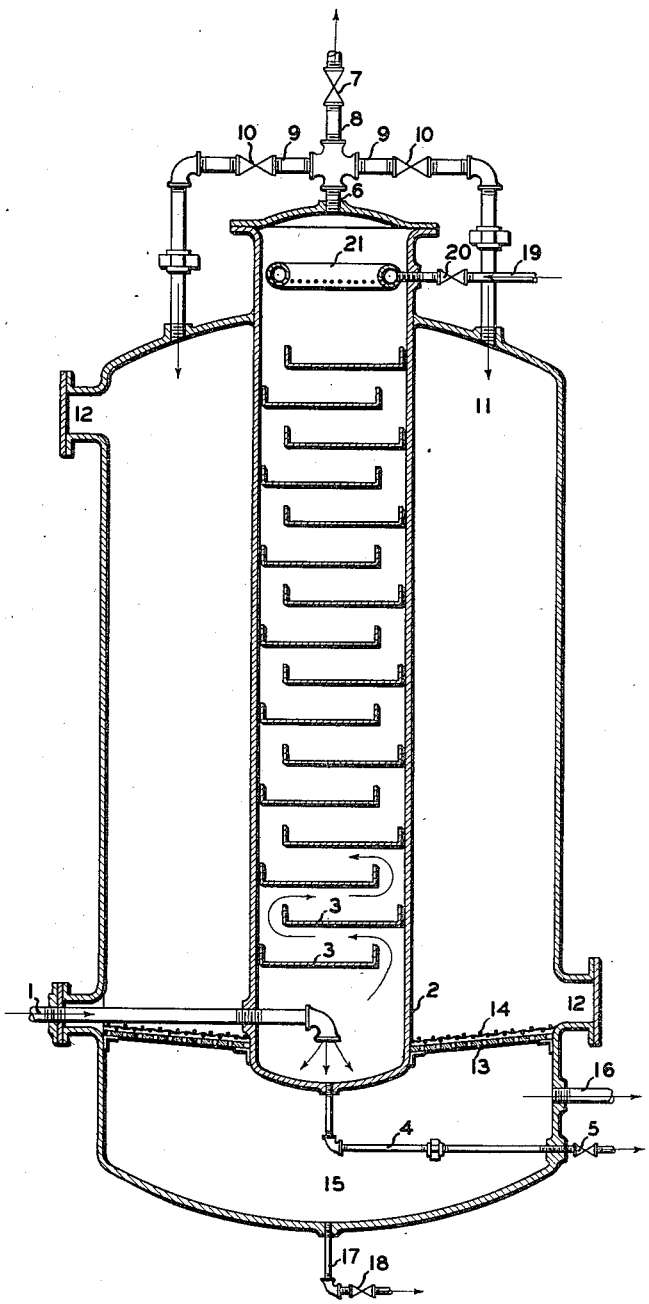

Referring now to Figure 1 of the drawings, the hydrocarbon vapors to be treated may be introduced into the apparatus from any source through line 1 which leads into the lower portion of the inner chamber 2. Inner chamber 2 is provided with pans or trays 3 upon which suitable treating material may be placed. The pans or trays 3, as here illustrated, are arranged in staggered form so that the vapors to be treated in passing upward through chamber 2 must pass over the surface of the treating material within said pans. If desired the pans or trays 3 may be perforated so that a portion or all of the vapors may pass through the beds of treating material within the pans. Chamber 2 may be heavily insulated, if necessary, to prevent excessive heat loss and condensation of the vapors and any condensate collected in this zone may be removed through line 4 controlled by valve 5.

Vapors after passing over or through the treating material within chamber 2 are withdrawn therefrom through line 6 and, with valve 7 in line 8 closed, the vapors may pass through either or both of the branch lines 9 through valves 10 into the upper portion of outer chamber 11. Outer chamber 11 may be totally or partially filled with treating material which usually is material of a different nature than that contained within chamber 2 and may consist of filtering material such as charcoal, bone black, fuller's earth, bentonite and the like or chamber 11 may, if desired, be totally or partially filled with layers of different materials. Chamber 11 is provided with filling and cleanout ports 12 and a grid or perforated plate 13 is provided in the lower portion of chamber 11 to support and retain the treating or filtering material. A screen 14 of suitable size mesh may be provided, if necessary, to assist in retaining the material and prevent its passage through perforations in plate 13. The vapors from chamber 2 pass downward in chamber 11 through the treating or filtering material or materials pass through the screen 14 and the perforated plate 13 into the lower section 15 of chamber 11. Treated vapors may be withdrawn from chamber 15 through line 16 to further treatment or to condensation, cooling and storage. Any condensate accumulating in chamber 15 may be withdrawn through line 17 and valve 18 and, if desired, a portion or the entire outer shell of chamber 11 may be insulated to prevent excessive heat loss and condensation of the vapors. If desired, a portion or all of the treated vapors from chamber 2 instead of passing through lines 9 into chamber 11 may be withdrawn to further treatment or to condensation, cooling and storage through line 8 controlled by valve 7. Other treating materials such as, for example, an acid solution may be introduced into chamber 2 through line 19 controlled by valve 20 and may be sprayed through spray coil 21 and intimately contacted with the vapors passing through this zone. Line 19, valve 20 and spray coil 21 may also be used, if so desired, for spraying water, caustic solution or any other suitable material into chamber 2 to be contacted with the vapors. Elements 19, 20 and 21 may also serve for the introduction of solutions of substances which may effect a regeneration of the treating materials contained on trays 3 when such material has lost its effectiveness from constant use. The unvaporized portion of the liquid treating material introduced through line 19, valve 20 and spray coil 21 which collects in the bottom of chamber 2, may be withdrawn through line 4 and valve 5, and may, if desired, be recirculated by means not shown back into line 19 and into chamber 2. Likewise any portion of this liquid treating material which may be vaporized and passed over with the vapors into chamber 11 in which may later condense and collect in chamber 15 may be withdrawn through line 17 and valve 18 and may, if desired, be recirculated by means not shown to line 19 and into chamber 2.

Figure 2:
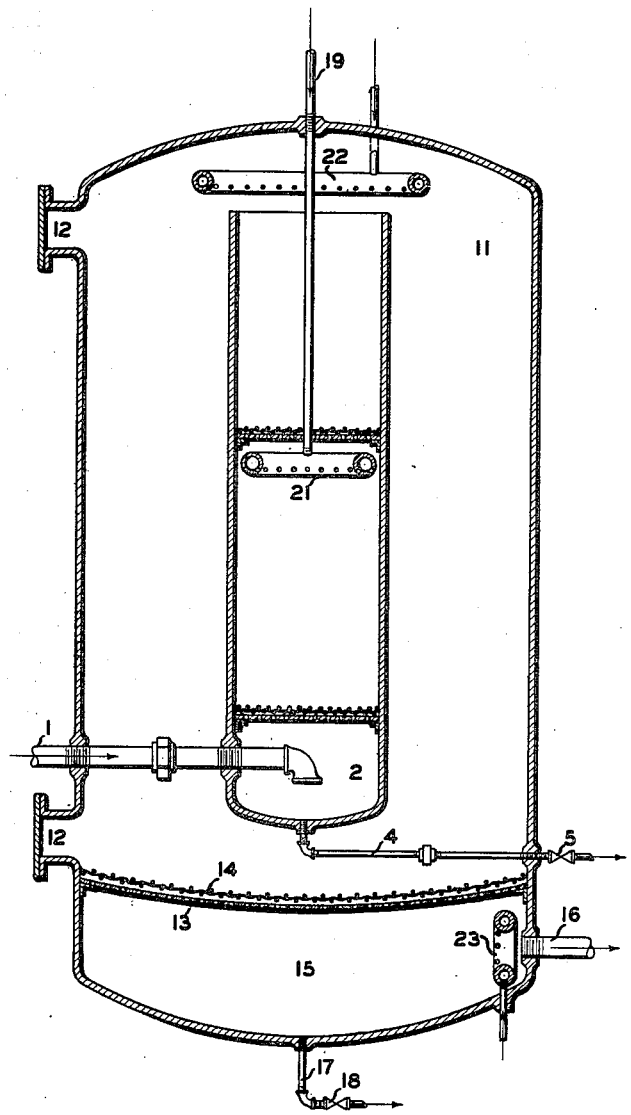

Figure 2 illustrates diagrammatically and not to scale, a slightly altered form of my improved apparatus. In this specific form of apparatus the vapors to be treated are introduced through line 1 into the lower portion of inner chamber 2 where they may be subjected to the action of a treating agent introduced through line 19 and spray coil 21. Treated vapors from the top of chamber 2 may pass directly into the upper portion of outer chamber 11. Outer chamber 11 is provided with filling and cleanout ports 12 and a grid or perforated plate 13 and screen 14 is provided a short distance above the bottom of chamber 11 to separate the lower portion 15 from the rest of the chamber and to support and retain any suitable treating or filtering material which may be placed above this plate.

Spray 22 which may be located in the upper portion of chamber 11 or chamber 2, and spray 23 in the lower portion 15 of chamber 11, are provided for the purpose of washing the vapors at these points with water or contacting them with liquid treating agents if so desired.

Treated vapors may be removed from the lower portion 15 of chamber 11 through line 16 and condensate collecting in zone 15 may be withdrawn through line 17 and valve 18. Condensate and/or unvaporized treating material collecting in the bottom of zone 2 may be withdrawn through line 4 and valve 5 and may, if desired be recirculated to line 19 and fed back into chamber 2 through spray coil 21.

As an example of one of the many specific treating operations in which my improved apparatus may be utilized, vapors from the fractionating tower of the cracking process which contain primarily material boiling within the range of commercial motor fuel may be treated to remove sulphur compounds undesirable color, odor and gum forming constituents in an apparatus such as illustrated in Figure 2 in the following manner.

The hot vapors are passed into chamber 2 where they are intimately contacted during their ascent through this zone with some 3 to 5 lbs. per barrel of 66° Bé. sulphuric acid. The vapors may then be water washed by means of spray 22 which may, in this case, be located in the top of either chamber 2 or chamber 11. The acid treated vapors may then pass downward in zone 11 through alternate beds of lime or caustic soda and filtering material such as fuller's earth or diatomaceous earth, which serves to neutralize the acid and to filter out undesirable materials. The vapors may again be water washed by means of spray coil 23 located in the lower portion 15 of chamber 11. The treated neutralized and filtered vapors are withdrawn through line 16 to condensation, cooling and storage. Spent acid is withdrawn through zone 2 through line 4 and valve 5 and any liquid collected in chamber 15 is withdrawn through line 17 and valve 18. Where apparatus of the type shown in Fig. 1 is used for the treatment of the hot hydrocarbon vapors, suitable treating material may be disposed on trays 3. For example, where such treating material functions to remove sulphur and undesirable sulphur compounds from the vapors, the trays may be filled with calcium carbide which reacts with the sulphur and vapors to form calcium sulphide. The sulphur-free hydrocarbons then pass either through line 8 or lines 9, as desired. The vapors may pass through lines 9 and valves 10 into chamber 11 where they may be treated as has been described in connection with Fig. 2 by passing other suitable treating or filtering material.

The calcium sulphide formed on the trays by the reaction of the calcium carbide with the sulphurous constituents of the vapors, may be treated to reform the calcium carbide by the introduction of water through the spray 21. Substances other than calcium carbide may be employed in the trays 3, these compounds being mentioned merely by way of illustration.

It should be clearly understood that treatments similar to that described or entirely different may be carried out in any of various forms of the improved apparatus herein disclosed and that the invention is not limited to the particular forms of apparatus illustrated and described nor to their use in connection with the specific treating methods described.

I claim:

1. A process for treating hydrocarbon vapors comprising passing vapors upwardly through a treating zone to contact with an acid reagent therein, withdrawing the vapors from said zone and reversing the flow thereof, the vapors then passing for further treatment through a second treating zone in the presence of a neutralizing treating agent.

2. A process for treating hydrocarbon vapors comprising passing the vapors upwardly through an acid treating agent in a primary treating zone, withdrawing the vapors into a second treating zone surrounding the first treating zone, and reversing the flow of vapors so as to pass for further treatment through the second treating zone in the presence of a neutralizing treating agent.

3. A process for treating hydrocarbon vapors which comprises passing the vapors upwardly through an initial treating agent in a primary treating zone, introducing into said zone an auxiliary treating material which passes downwardly countercurrent to the vapors, withdrawing the vapors from the primary treating zone into a secondary treating zone wherein a final polymerizing treating agent is maintained and which surrounds the primary treating zone, and reversing the flow of vapors which pass through the secondary treating zone during further treatment.

4. Apparatus for the treatment of hydrocarbon vapors which comprises an inner chamber, means disposed at the lower portion thereof whereby vapors are introduced into the chamber, means at the upper portion of the chamber whereby vapors may be removed therefrom, an outer chamber surrounding the said inner chamber, and adapted to receive the vapors as they are removed from the inner chamber, means associated with the inner chamber for introducing liquid treating agent thereto, and means in the outer chamber for receiving and supporting solid treating material therein.

5. Apparatus for the treatment of hydrocarbon vapors which comprises an inner chamber, means disposed at the lower portion of said inner chamber for introducing vapors therein, means at the upper portion of said chamber for withdrawing the vapors, trays vertically disposed in said inner chamber in alternately staggered relationship for retaining a solid treating agent, an outer chamber surrounding the inner chamber and adapted to receive the vapors therefrom as they are withdrawn from the inner chamber, and means in said outer chamber adapted to receive and support suitable treating material therein in reacting characteristics unlike that maintained in said inner chamber.

6. Apparatus for the treatment of hydrocarbon vapors which comprises an inner chamber, means disposed at the lower portion thereof for the introduction of vapors into the chamber, means at the upper portion of the chamber for withdrawing the vapors therefrom, said chamber having disposed therein a plurality of trays in alternately staggered relationship adapted to retain a treating material, further means in said inner chamber for the introduction of an additional treating material therein, an outer chamber surrounding said inner chamber and adapted to receive the vapors as they are withdrawn from the inner chamber, the outer chamber having means whereby another suitable treating material may be received and supported therein.

7. Apparatus for the treatment of hydrocarbon vapors which comprises an inner chamber, means disposed at the lower portion thereof for the introduction of vapors, means at the upper portion of said inner chamber whereby the vapors may be withdrawn from the inner chamber, means associated with the inner chamber whereby a liquid treating material may be introduced into the inner chamber, an outer chamber surrounding the inner chamber and adapted to receive the vapors as they are withdrawn therefrom, the outer chamber having means therein for receiving and supporting suitable solid treating material, said outer chamber having means at the lower portion thereof for withdrawing the treated vapors therefrom, additional means being provided and associated with the outer chamber whereby a flow of the vapors is effected upwardly through the inner chamber and downwardly through the outer chamber.

8. A process for treating vapors produced in a hydrocarbon oil cracking process which comprises passing said vapors through a treating zone wherein a body of calcium carbide is maintained to remove the sulphur content of said vapors, simultaneously introducing an acid reagent into said zone to flow downwardly therethrough, countercurrent to said vapors, and thereafter passing the sulphur-free vapors through a body of solid adsorbent material maintained in a zone separate from said first-mentioned treating zone.

JACOB BENJAMIN HEID.